United States Patent [19]
Fetzer

[11] Patent Number: 6,066,932
[45] Date of Patent: May 23, 2000

[54] MOTOR REVERSAL PROTECTION APPARATUS

[76] Inventor: Fred Fetzer, 16817 Albion Rd., Strongsville, Ohio 44136

[21] Appl. No.: 09/110,230

[22] Filed: Jul. 6, 1998

[51] Int. Cl.[7] .................................. G05B 5/00; H02P 1/00
[52] U.S. Cl. ............................ 318/445; 318/280; 318/446
[58] Field of Search ..................... 318/280–293, 318/471, 676, 445, 373, 443, 246, 444, 251, 381, 446; 388/800–890; 307/141.8, 127; 74/30; 354/81, 293, 108; 248/349; 102/254, 262

[56] References Cited

U.S. PATENT DOCUMENTS

| | | | |
|---|---|---|---|
| 3,554,325 | 1/1971 | Savage | 187/29 |
| 3,671,834 | 6/1972 | Buckeridge | 318/293 |
| 3,717,803 | 2/1973 | Sweger | 318/471 |
| 3,745,839 | 7/1973 | Ramstetter | 74/30 |
| 4,045,682 | 8/1977 | Poorbaugh et al. | 307/127 |
| 4,499,409 | 2/1985 | Bauer | 318/383 |
| 4,698,560 | 10/1987 | Andrei-Alexandru et al. | 318/54 |
| 5,159,368 | 10/1992 | Zemlin | 354/81 |
| 5,161,083 | 11/1992 | Mohler et al. | 361/143 |
| 5,216,212 | 6/1993 | Golowash et al. | 200/1 V |
| 5,252,897 | 10/1993 | Porter et al. | 318/443 |
| 5,279,226 | 1/1994 | Ritchie et al. | 102/254 |
| 5,311,108 | 5/1994 | Willard | 318/381 |
| 5,649,808 | 7/1997 | Gruszecki et al. | 417/63 |

*Primary Examiner*—Paul Ip
*Attorney, Agent, or Firm*—Joseph H. Taddeo

[57] ABSTRACT

A motor reversal protection system to protect driven equipment from the inadvertent or accidental reversal of direction of a three-phase electric motor should there be a reversal of phase in the transmission power lines by transposing any pair of the three power lines. The system detects the phase sequence of the applied power and automatically provides the driven equipment with the correct phase sequence within milliseconds of depressing the motor start push button. The need for a system reset is obviated in using this novel system design. The same principles of operation also apply for use with two-phase or DC power systems.

39 Claims, 11 Drawing Sheets

MOTOR REVERSAL PROTECTION APPARATUS

FIELD OF INVENTION

The present invention relates to a motor reversal protection apparatus, and more particularly to an apparatus to protect driven equipment from the inadvertent or accidental reversal of direction of an electrically operated motor should there be a reversal of phase or polarity in the transmission power lines.

BACKGROUND OF THE INVENTION

Electric motors, such as three-phase, two-phase and DC motors, when once installed, often rotate in a predetermined direction of rotation. In many installations and applications, it is essential that the predetermined direction of rotation be maintained and that there should be no occurrence of rotation in the reverse direction. When the direction of rotation is inadvertently reversed, there is the potential damage to the driven equipment and may even be hazardous to those riding in or upon a conveyance driven by these motors.

It is not uncommon for power interruptions to occur in power distribution systems. At the end of these power interruptions, when the power is restored, the phase or polarity is sometimes reversed through the inadvertent transposition or interchangement of the input wires.

In three-phase systems, a reversal in motor direction occurs when any two of three power lines are interchanged. In a two-phase system, a change of motor direction occurs when either pair, the reference or quadrature power lines, are transposed. In a DC power system, such reversal of motor direction occurs when the polarity of the input power lines is interchanged.

As such, in three-phase or two phase applications, such phase reversals can also occur when a power distribution transformer is removed or replaced in local repair or maintenance. Accidental reversals of phase or polarity can also occur in larger facilities, such as steel mills, automotive assembly and production plants, when maintenance electricians or maintenance personnel are installing or replacing other equipment along a production stream.

Equipment that is sensitive to the reversal of the direction of rotation include conveyers, both belt and overhead, escalators, people movers, elevators and other conveyance equipment. Severe damage can result when the direction of rotation is inadvertently reversed; serious injuries to persons being transported can be the result of such reversal. In the case of conveyers for use in assembly operations, serious physical damage to the product and tooling can occur during such an event.

Motor reversal protection can also be effective in equipment such as hydraulic pumps, air compressors, production punch presses, and the like. When the direction of rotation of these pieces of equipment are reversed, serious physical damage can occur, which would result in long down times, as well as, increased repair or replacement costs.

There are several U.S. Patents that disclose phase reversal switch mechanisms, one of which one that teaches of a power switching device; another teaches of three phase reversal protection. They are and include:

U.S. Pat. No. 4,357,502, granted Nov. 2, 1982, to H. R. Beck, discloses a three-phase, phase reversal switch assembly which is driven by an actuation device to provide a rectilinear motion that applies torque to a rotatable mechanism. A second device engages is a shift mechanism that operates a shift link to engage torque transmission to one or the other reversal mechanisms. The means for actuating the switch and shift actuators are not disclosed, nor is the any means of phase sequence detection.

U.S. Pat. No. 4,045,682, granted Aug. 30, 1977, to C. R. Poorbaugh, et al, discloses a three-phase fractional horsepower motor having a specialized cam plate, its rotary position being sensed by microswitches to control the activation of a solenoid driven motor contactor. The system as disclosed by Poorbough, et al, teaches that when the phase is reversed, that it is impossible to start the three phase motor. It does not attempt to correct for a reversed phase condition and requires that the cam plate be manually repositioned to reset the device to restore electrical service to the attached equipment.

U.S. Pat. No. 3,673,426, granted Jun. 27, 1972, to D. E. Weston, et al, teaches of a three-phase switch that is primarily used for selectively connecting an electrical rotary machine to a power distribution system for use as a generator to supply power to the system or for use as a motor that is drawing power from the system.

Accordingly, it is an object of the present invention to provide an apparatus that is responsive to the phase sequence of the power lines connected to a three-phase motor such that the motor will operate in a unidirectional manner.

It is another object of the present invention to provide an apparatus that is responsive to the phase sequence of the power lines connected to a three-phase motor that will prevent a three-phase motor to operate in the reverse direction of rotation.

It is still another object of the present invention to provide an apparatus that is responsive to the phase sequence of the power lines connected to a three-phase motor that will prevent a three-phase motor and its driven load to operate in the reverse direction of rotation.

It is still yet another object of the present invention to provide an apparatus that is responsive to the phase sequence of the power lines connected to a three-phase motor that will automatically prevent a three-phase motor and its driven load to operate in the reverse direction of rotation without the necessity of being reset upon detection of a phase reversal.

An additional object of the present invention is to provide an apparatus that is responsive to the phase sequence of the power lines connected to a three-phase motor that will automatically protect a driven load to operate in the reverse direction of rotation.

Still, an additional object of the present invention is to provide an apparatus that is responsive to the phase sequence of the power lines in a two-phase power distribution system, connected to a two-phase motor that will automatically prevent the two-phase motor and its driven load to operate in the reverse direction of rotation without the necessity of being reset upon detection of a polarity reversal.

A final object of the present invention is to provide an apparatus that is responsive to the polarity of the power lines connected to a DC motor that will automatically prevent a DC motor and its driven load to operate in the reverse direction of rotation without the necessity of being reset upon detection of a polarity reversal.

These and other objects and advantages of the present invention will be better appreciated and understood upon reading the following detailed description, when taken in conjunction with the attached accompanying drawings.

SUMMARY OF THE INVENTION

The present invention relates to an apparatus that can sense and determine the applied phase relationship of an electrically driven motor by determining the direction of rotation of a secondary phase sequence detecting motor. The secondary phase sequence detecting motor trips either one of two switches corresponding to the direction of rotation, thereby allowing the appropriate motor starting contactor to close to start the motor-being-protected in the desired direction of rotation and preventing its rotation in the opposite direction. Not only is the motor-being-protected prevented from rotating in the opposite direction, but the applied voltage is corrected so that when applied the voltage is applied, the motor-being-protected is started in the same direction of rotation as it was before correction.

BRIEF DESCRIPTION OF THE DRAWINGS

The present invention is illustrated in the accompanying drawings that are made a part hereof, as follows.

DETAILED DESCRIPTION OF THE PREFERRED EMBODIMENT

There may be an occasion when in the repair or installation of power transmission or power distribution lines where two power lines are inadvertently transposed thereby causing a phase reversal in a three-phase power system. These accidental phase reversals can occur when line repairers are replacing a line transformer or repairing fallen power lines. Maintenance electricians can also cause a reversal of phase upon installation of new equipment or even during plant expansion.

When the phase is reversed in a three-phase power system, the driven motor undergoes a reversal in the direction of rotation. A phase reversal in a three-phase power system can be quite devastating, causing severe damage to the driven equipment. Not only equipment, such as, conveyers, escalators, people movers and elevators, suffer damage from such reversals but products being conveyed can be destroyed, as well as personal injury to those being transported.

The present invention relates to a protection system for a motor and it's driven equipment to prevent the reversal in the direction of rotation of the motor, should the applied phases be transposed or interchanged accidentally in a three-phase power system.

EXAMPLES

Figure 1:
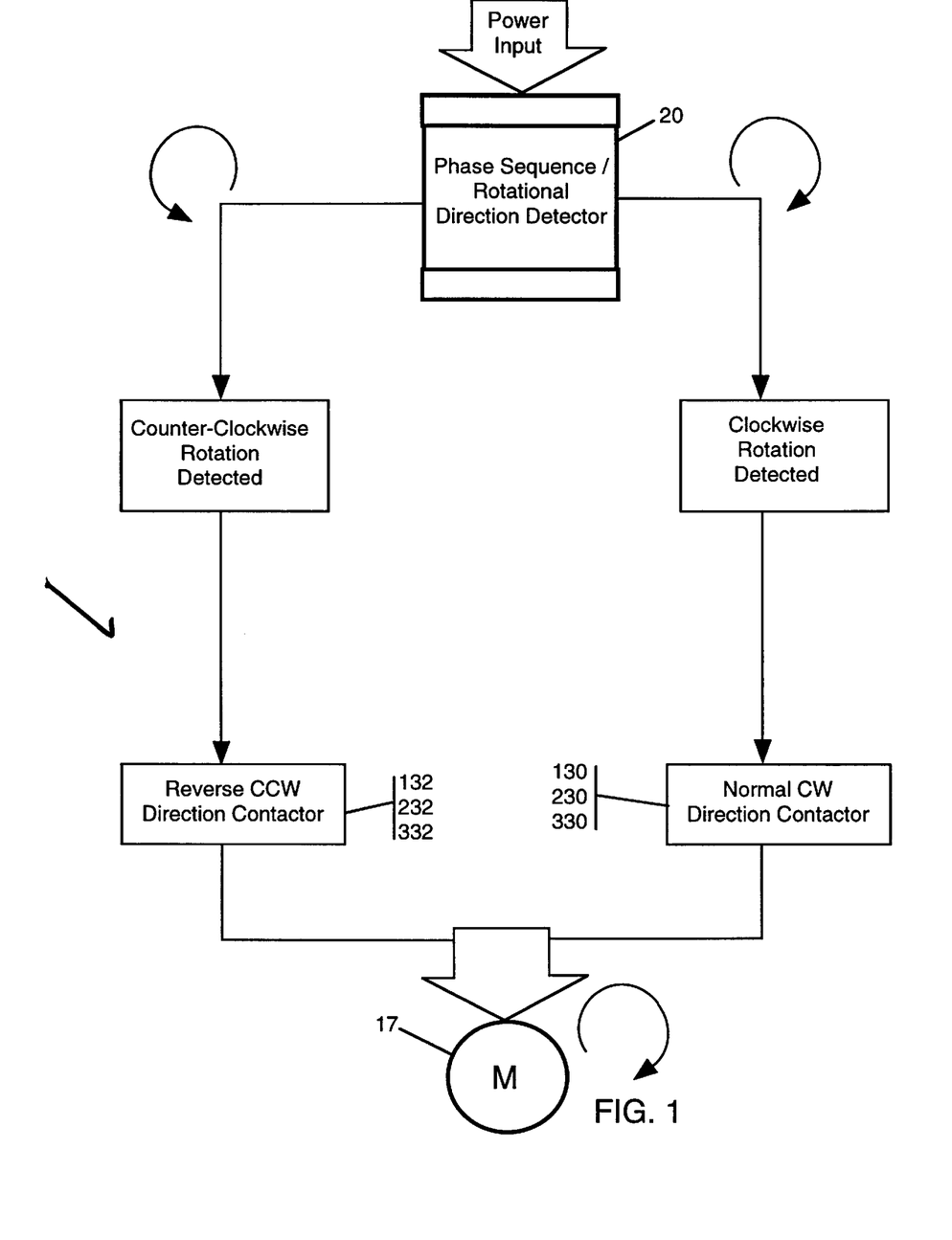
FIG. 1 is a block diagram showing a typical the application of the motor rotational direction determination apparatus by correcting the applied phase sequence of an AC system or in the case of a DC system, by correcting the applied polarity arrangement.

FIG. 1 shows diagrammatically the motor reversal protection system of the present invention. Power is applied to the input of the motor protective device 20. The motor protective device is capable of determining the phase sequence that corresponds to the direction of rotation of the driven motor 17. The output corresponding to the normal direction of rotation, for example being clockwise, connects to the normal mode motor starting contactor 120. Also, the output corresponding to the reverse direction of rotation, for example being counter-clockwise, connects to the reverse mode motor starting contactor 122.

Figure 2A:
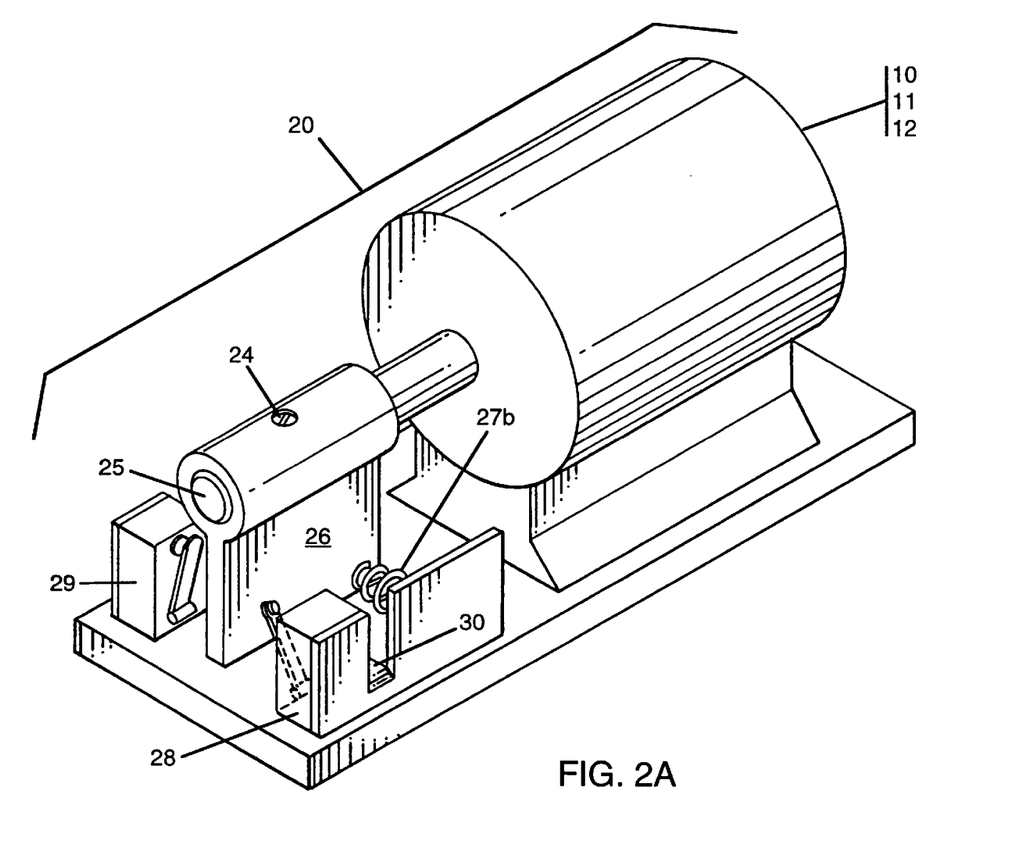
FIG. 2A is a perspective view of a typical motor rotational direction controller.
Figure 2B:
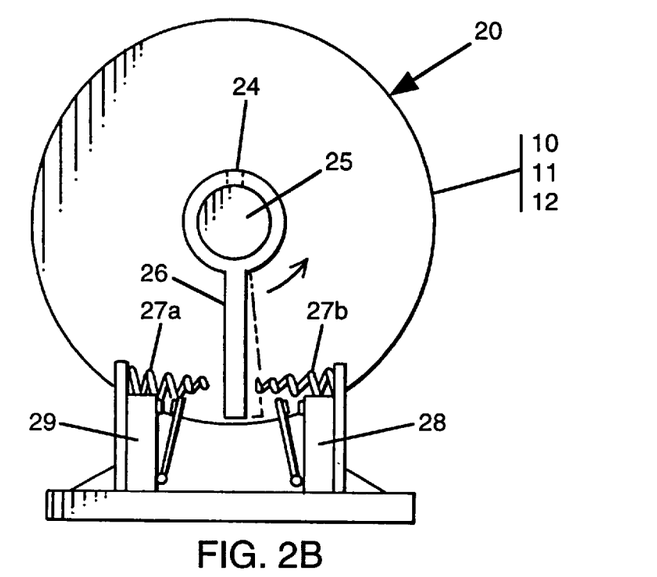
FIG. 2B is a front elevation view of a typical motor rotational direction controller.
Figure 2C:
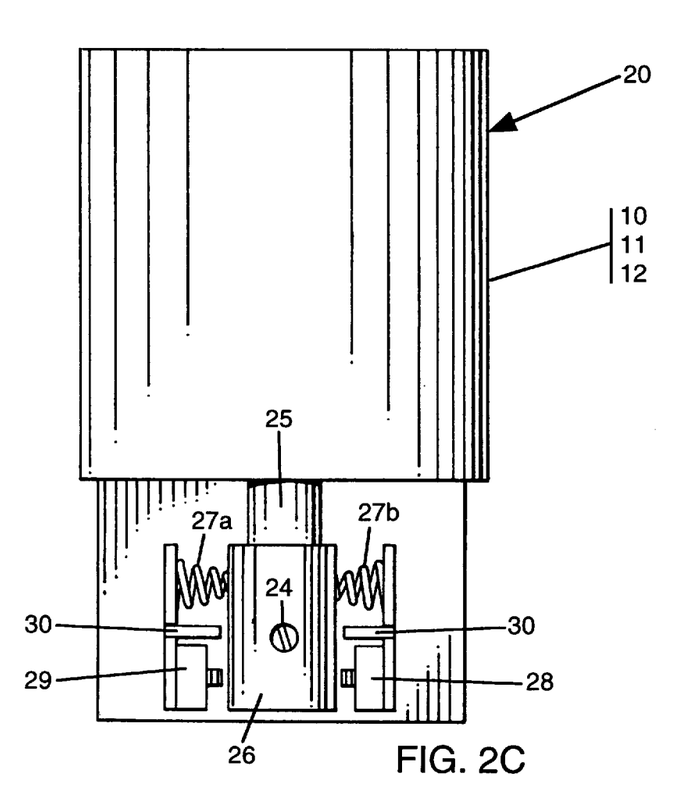
FIG. 2C is a top plan view of a typical motor rotational direction controller.

Shown in FIGS. 2a, 2b and 2c, are several views of the motor reversal protection device 20; the first view being a perspective drawing, the remaining, a front and top view respectively.

The examples that follow will show the application of the motor protection system to several commonly used power distribution systems; the first being a three-phase power system, the second, a two-phase power system, and the third, a DC distribution system to better illustrate the advantages of the present invention.

Example I

The present invention always determines the phase sequence of the applied input power, whether it is an ABC sequence or a reversed BAC sequence, determines the resulting direction of rotation of the protected motor using the phase sequence sensing motor, correcting the applied phase sequence to the protected motor upon starting it, so that it will always rotate in a unidirectional direction, thereby protecting the protected motor and its load, without the necessity of providing a resetting device.

In a three-phase system, the direction-sensing motor 10 is typically a three-phase motor, such as a Bodine ¹⁄₂₀th Fractional Horsepower Motor, type NPP-34, 230/460 VAC, that is rated for continuous duty, or any other similar three-phase motor. Secured to the motor shaft 25 by a setscrew 24 is a direction switch actuator or vane 26. When the direction-sensing motor 10 starts, its direction being determined by the phase sequence when connected to the input power lines, the actuator vane 26 is free to rotate in either a clockwise or counter-clockwise direction. The actuator vane is held in a neutral centered position by springs 27a and 27b. Through the use of these springs, the protection device can be mounted in virtually any position, thereby not being influenced by the gravitational forces being exerted upon it. When the vane actuator 26 rotates in the clockwise direction, it activates microswitch 29 by depressing the leaf spring attached to the microswitch. Should the actuator vane 26 rotate in the opposite direction, counter-clockwise, microswitch 28 is activated. Rotational stops 30 prevent the vane from over-traveling thereby protecting the microswitches from having too much force exerted upon them.

Figure 3:
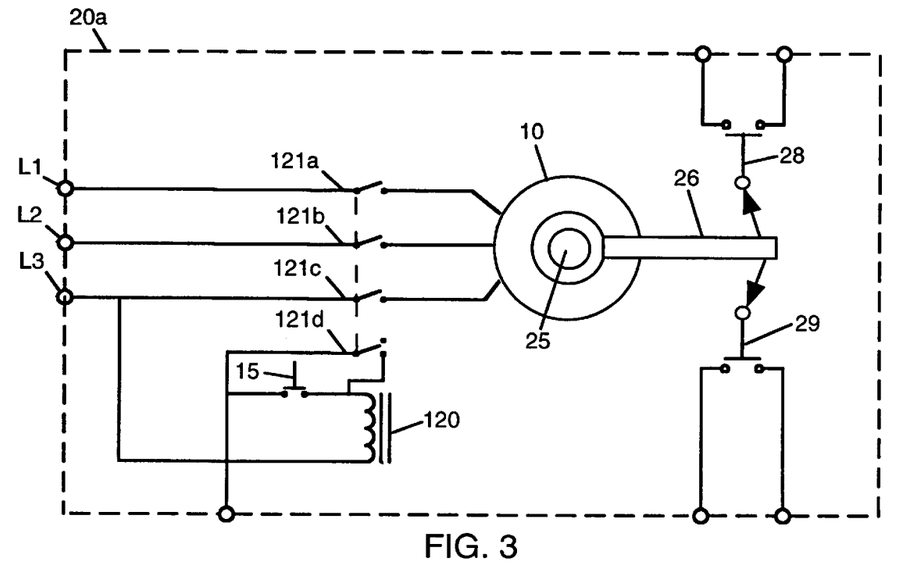
FIG. 3 is a schematic drawing of the motor rotational direction control module for use with a weighted actuator vane that is held in position between microswitches by gravity.

In FIG. 3, a weighted actuator vane 26 is held in position between microswitches 28 and 29 by gravity along, such that the vane 26 is free to rotate in either a clockwise or counter-clockwise direction without overcoming any spring bias. As such, the protection device must be mounted in a horizontal position, whereby the motor shaft 25, more specifically, the actuator vane 26, being sufficiently weighted, as such and attached thereto, is influenced solely by the gravitational forces being exerted upon it.

Figure 3A:
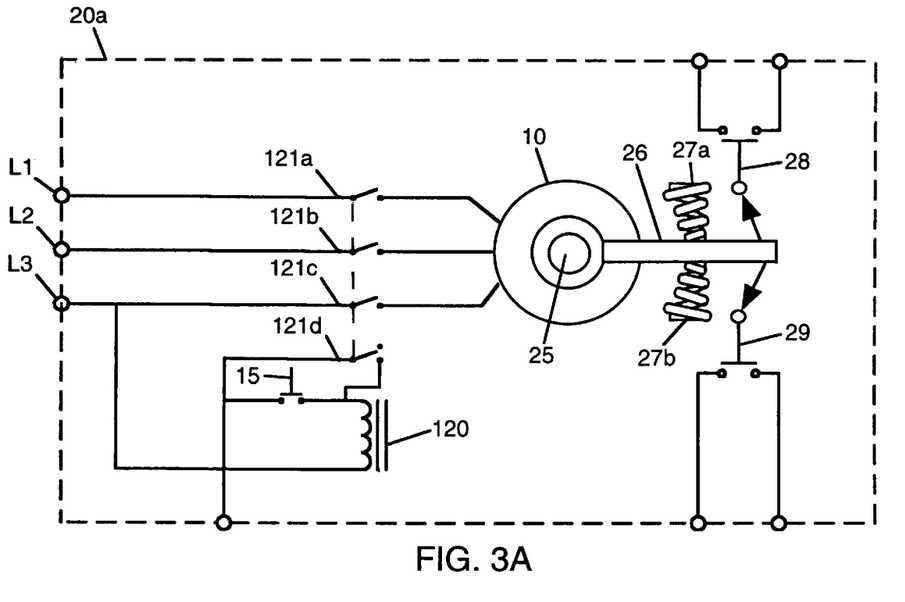
FIG. 3A is a schematic view of the motor rotational direction control module for use in a three-phase motor application.

FIG. 3A shows schematically the motor reversal protection device when used in a three-phase power application. The input power lines connect to terminals L1, L2 and L3. Motor start relay 120 is energized by closure of the momentary contact push button 15. Relay contact 121d provides the relay 120 to be self-latching. Energizing start relay 120 closes contacts 121a, 121b and 121c, thereby applying power to a three-phase direction-sensing motor 10. Attached to motor shaft 25 is actuator vane 26 which is centered by gravity or alternatively by springs 27a and 27b. If the vane actuator 26 rotates in the clockwise direction, it closes microswitch 29; should it rotate in the opposite direction, counter-clockwise, microswitch 28 is closed.

Figure 4:
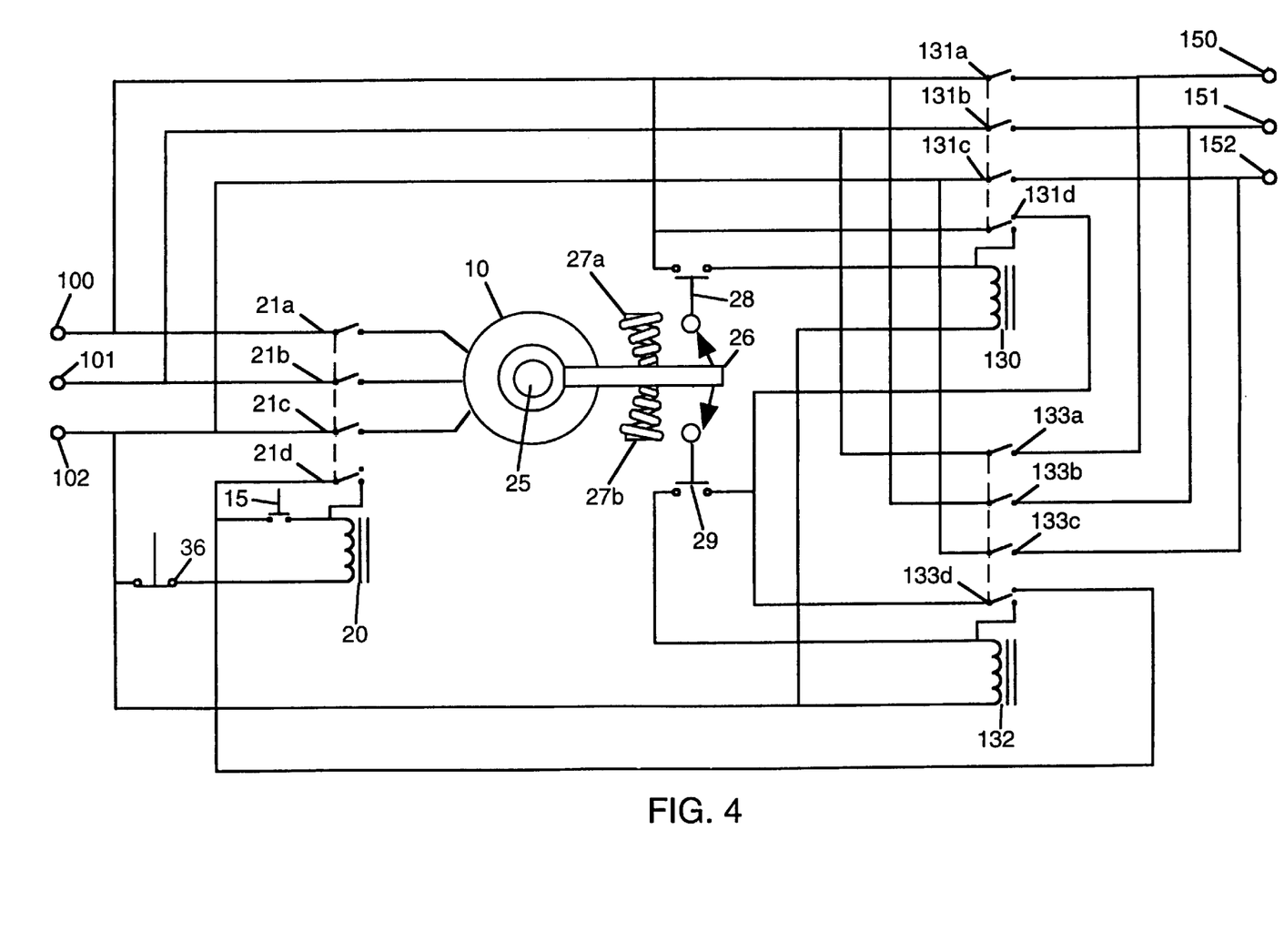
FIG. 4 is a schematic view of the motor rotational direction detector as applied in protecting and correcting the phase sequencing in a three-phase motor application.

Turning now to FIG. 4, illustrated schematically is the motor reversal protection device when applied to a three-phase power system. The power input to the system is applied via input terminals 100, 101 and 102 in an ABC phase sequence. Depressing momentary contact push button 15 applies voltage to the coil of start relay 20, energizing it. Relay contact 21d self-latches start relay 20. Upon energizing the relay start relay, contacts 21a, 21b and 21c close, starting the three-phase direction-sensing motor 10. Attached to motor shaft 25 is actuator vane 26 which is centered by springs 27a and 27b. If the actuator 26 being rotated by motor 10, rotates in the counter-clockwise direction, it closes microswitch 28, which in turn energizes the coil of the normal mode contactor 130. By energizing coil 130, the contacts 131a, 131b and 131c close, applying a three-phase voltage, having an ABC phase sequence to the protected motor that is connected to terminals 150, 151 and 152. Concurrent with the energization of contactor 130 is the closure of the normally open contact 131d and the opening of the normally closed contact of 131d, where 131d is a SPDT relay contact. The normally open contact serves to provide a self-latching contact for contactor 130 and the normally closed contact breaks the circuit to start relay 20, de-energizing start relay 20 and thereby stopping the rotation of direction-sensing motor 10.

In the event the actuator 26 being rotated by motor 10, rotates in a clockwise direction, it then closes microswitch 29, which in turn energizes the coil of the reverse mode contactor 132. By energizing coil 132, the contacts 132a, 132b and 132c close, applying a three-phase voltage, having a BAC phase sequence to the protected motor connected to terminals 150, 151 and 152. Concurrent with the energization of contactor 132 is the closure of the normally open contact 132d and the opening of the normally closed contact of 132d, where 132d is a SPDT relay contact. The normally open contact serves to provide a self-latching contact for contactor 132 and the normally closed contact breaks the circuit to start relay 20, de-energizing start relay 20 and thereby stopping the rotation of direction-sensing motor 10. Stopping the motor reversal protection system is accomplished by depressing the momentary stop switch 36.

Example II

Figure 3B:
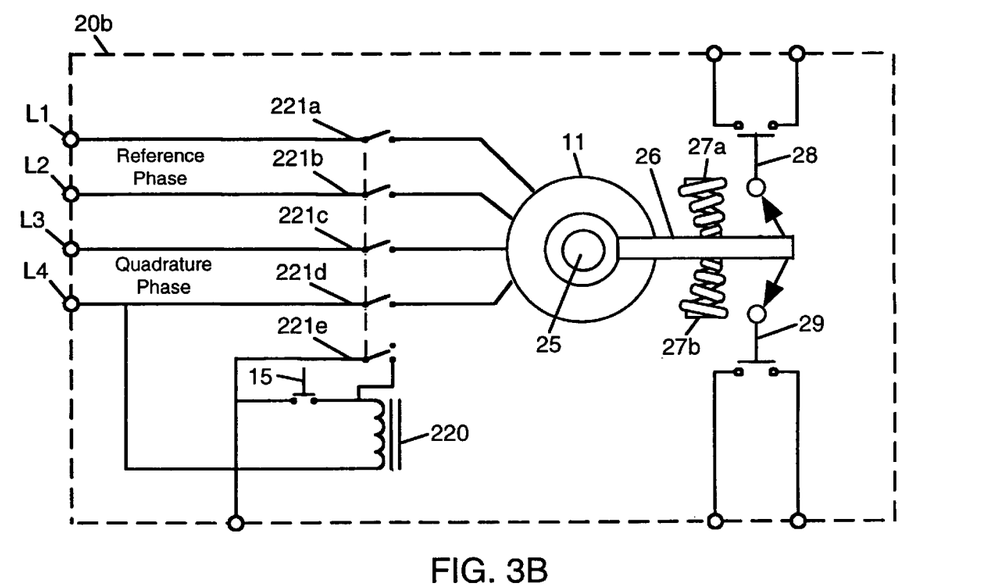
FIG. 3B is a schematic view of the motor rotational direction control module for use in a two-phase motor application.

In another embodiment, shown in FIG. 3B is a schematic representation of the motor reversal protection device when used in a two-phase power application. The input power lines connect to reference phase terminals L1 and L2 and quadrature phase terminals L3 and L4. Motor start relay 220 is energized by closure of the momentary contact push button 15. Relay contact 221e provides the relay 220 with a self-latching contact. Energizing start relay 220 closes contacts 221a, 221b, 221c and 221d, thereby applying power to a two-phase direction-sensing motor 11. Attached to motor shaft 25 is actuator vane 26 which is centered by springs 27a and 27b. If the vane actuator 26 rotates in the clockwise direction, it closes microswitch 29; should it rotate in the opposite direction, counter-clockwise, microswitch 28 is closed.

Figure 5:
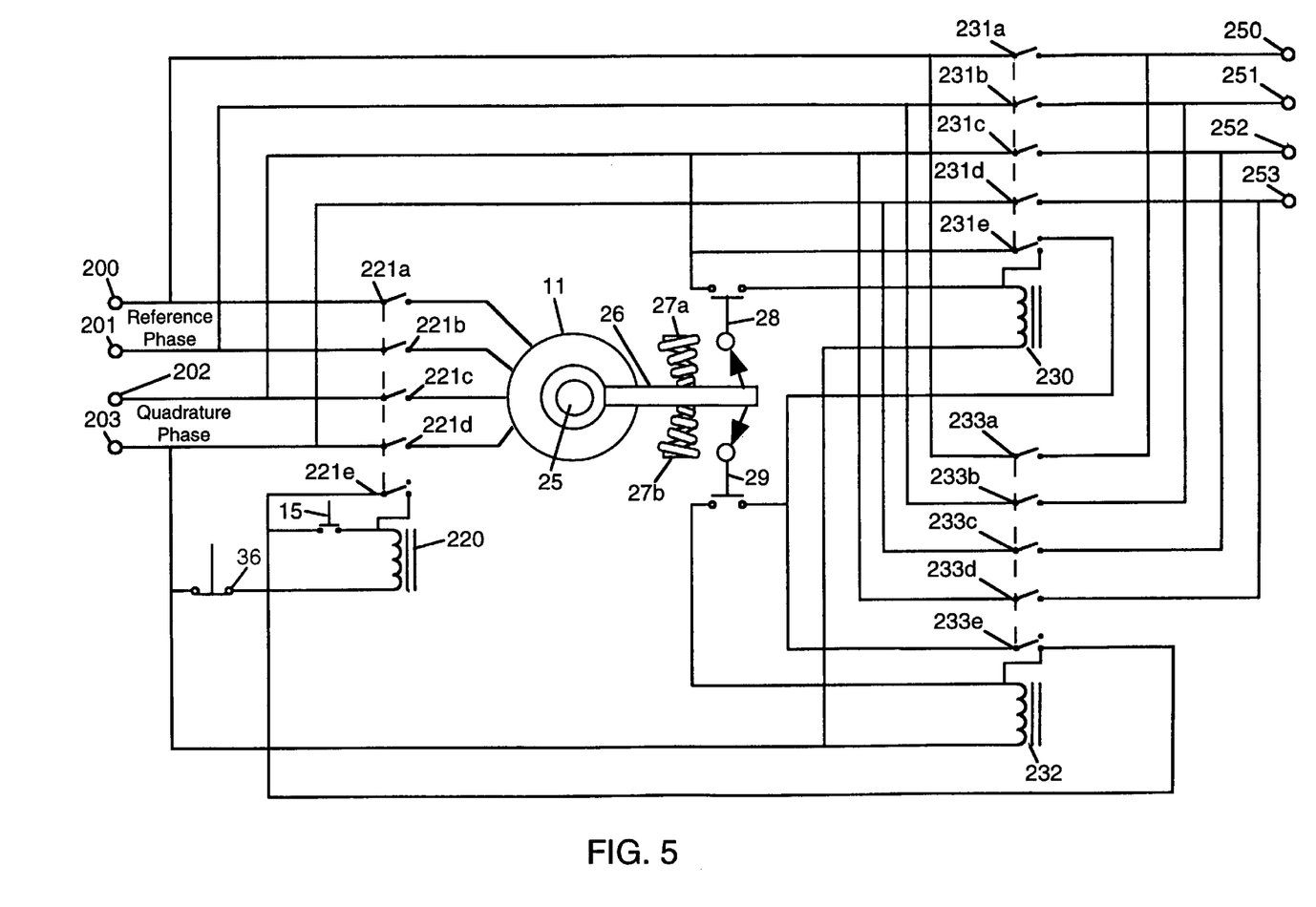
FIG. 5 is a schematic view of the motor rotational direction detector as applied in protecting and correcting the phase sequencing in a two-phase motor application.

In another embodiment, shown in FIG. 5 is a schematic representation of the motor reversal protection device when used in a two-phase power application. The input power lines connect to reference phase terminals 200 and 201 and quadrature phase terminals 202 and 203. Motor start relay 220 is energized by closure of the momentary contact push button 15. Relay contact 221e provides the relay 220 with a self-latching contact. Energizing start relay 220 closes contacts 221a, 221b, 221c and 221d, thereby applying power to a two-phase direction-sensing motor 11. Attached to motor shaft 25 is actuator vane 26 which is centered by springs 27a and 27b. If the actuator 26 being rotated by motor 11, rotates in the counter-clockwise direction, it closes microswitch 28, which in turn energizes the coil of the normal mode contactor 230. By energizing coil 230, the contacts 231a, 231b, 231c and 231d close, applying a two-phase voltage, having a normal phase sequence to the protected motor that is connected to terminals 250, 251, 252 and 253. Concurrent with the energization of contactor 230 is the closure of the normally open contact 231e and the opening of the normally closed contact of 231e, where 231e is SPDT relay contact. The normally open contact serves to provide a self-latching contact for contactor 230 and the normally closed contact breaks the circuit to start relay 20, de-energizing start relay 20 and thereby stopping the rotation of direction-sensing motor 11.

In the event the actuator 26 being rotated by motor 11, rotates in a clockwise direction, it then closes microswitch 29, which in turn energizes the coil of the reverse mode contactor 232. By energizing coil 232, the contacts 233a, 233b, 233c and 233d close, applying a two-phase voltage, having a reverse phase sequence to the protected motor connected to terminals 250, 251, 252 and 253. Concurrent with the energization of contactor 232 is the closure of the normally open contact 233e and the opening of the normally closed contact of 233e, where 233e is SPDT relay contact. The normally open contact serves to provide a self-latching contact for contactor 232 and the normally closed contact breaks the circuit to start relay 20, de-energizing start relay 20 and thereby stopping the rotation of direction-sensing motor 11. Stopping the motor reversal protection system is accomplished by depressing the momentary stop switch 36.

Example III.

Figure 3C:
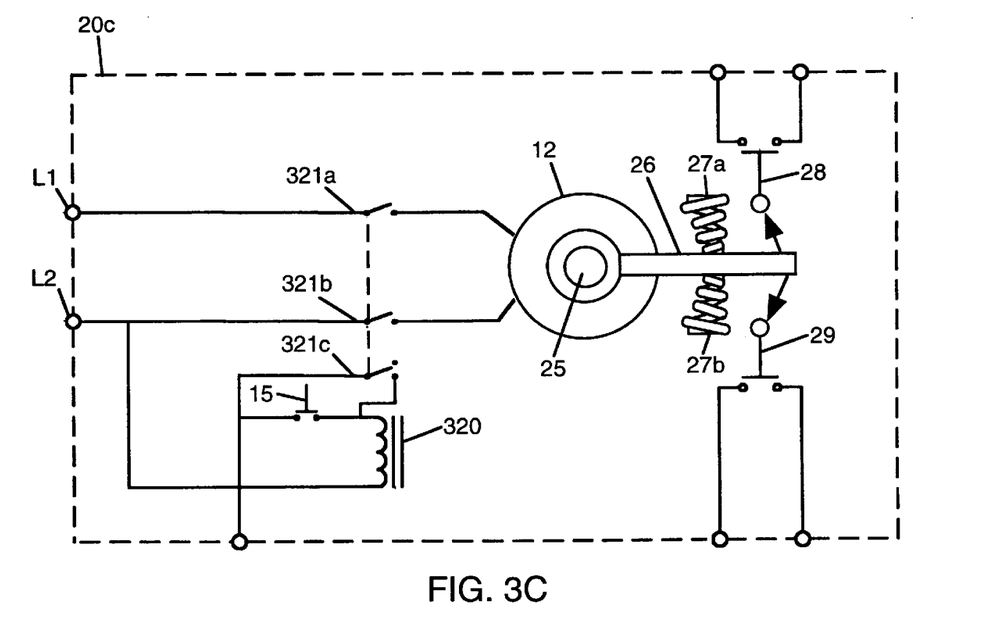
FIG. 3C is a schematic view of the motor rotational direction control module for use in a DC-motor application.

In still another embodiment, shown in FIG. 3C is a schematic representation of the motor reversal protection device when used in a direct-current power application. The input power lines connect to input terminals L1 and L2. Motor start relay 320 is energized by closure of the momentary contact push button 15. Relay contact 321c provides the relay 320 to be self-latching. Energizing start relay 320 closes contacts 321a and 321b, thereby applying power to a direction-sensing DC motor 12. Attached to motor shaft 25 is actuator vane 26 which is centered by springs 27a and 27b. If the vane actuator 26 rotates in the clockwise direction, it closes microswitch 29; should it rotate in the opposite direction, counter-clockwise, microswitch 28 is closed.

Figure 6:
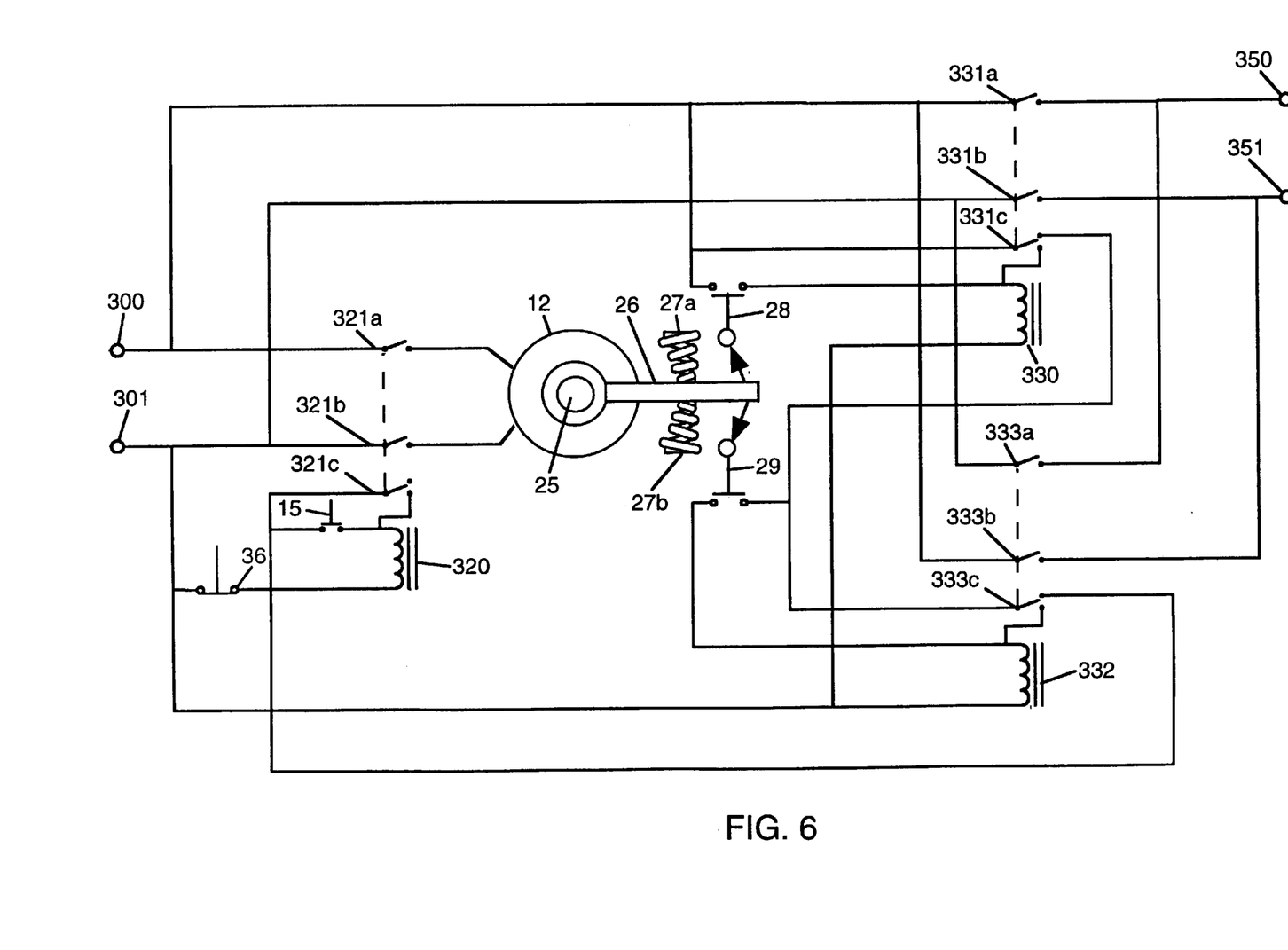
FIG. 6 is a schematic view of the motor rotational direction detector as applied in protecting and correcting the polarity in a DC motor application.

In still another embodiment, shown in FIG. 6 is a schematic representation of the motor reversal protection device when used in a DC power application. The input power lines connect to reference phase terminals 300 and 301. Motor start relay 320 is energized by closure of the momentary contact push button 15. Relay contact 321c provides the relay 320 with a self-latching contact. Energizing start relay 320 closes contacts 321a and 321b, thereby applying power to a direction-sensing DC motor 12. Attached to motor shaft 25 is actuator vane 26 which is centered by springs 27a and 27b. If the actuator 26 being rotated by motor 12, rotates in the counter-clockwise direction, it closes microswitch 28, which in turn energizes the coil of the normal mode contactor 330. By energizing coil 330, the contacts 331a and 331b close, applying a DC voltage, having a normal polarity to the protected motor that is connected to terminals 350 and 351. Concurrent with the energization of contactor 330 is the closure of the normally open contact 331c and the opening of the normally closed contact of 331c, where 331c is a SPDT relay contact. The normally open contact serves to provide a self-latching contact for contactor 330 and the normally closed contact breaks the circuit to start relay 20, de-energizing start relay 20 and thereby stopping the rotation of direction-sensing motor 12.

In the event the actuator 26 being rotated by motor 12, rotates in a clockwise direction, it then closes microswitch 29, which in turn energizes the coil of the reverse mode contactor 332. By energizing coil 332, the contacts 332a and 332b close, applying a DC voltage, having a reverse polarity to the protected motor that is connected to terminals 350 and 351. Concurrent with the energization of contactor 332 is the closure of the normally open contact 332c and the opening of the normally closed contact of 332c, wherein 332c is a SPDT relay contact. The normally open contact serves to provide a self-latching contact for contactor 332 and the normally closed contact breaks the circuit to start relay 20, de-energizing start relay 20 and thereby stopping the rotation of direction-sensing motor 12. Stopping the motor reversal protection system is accomplished by depressing the momentary stop switch 36.

Figure 3D:
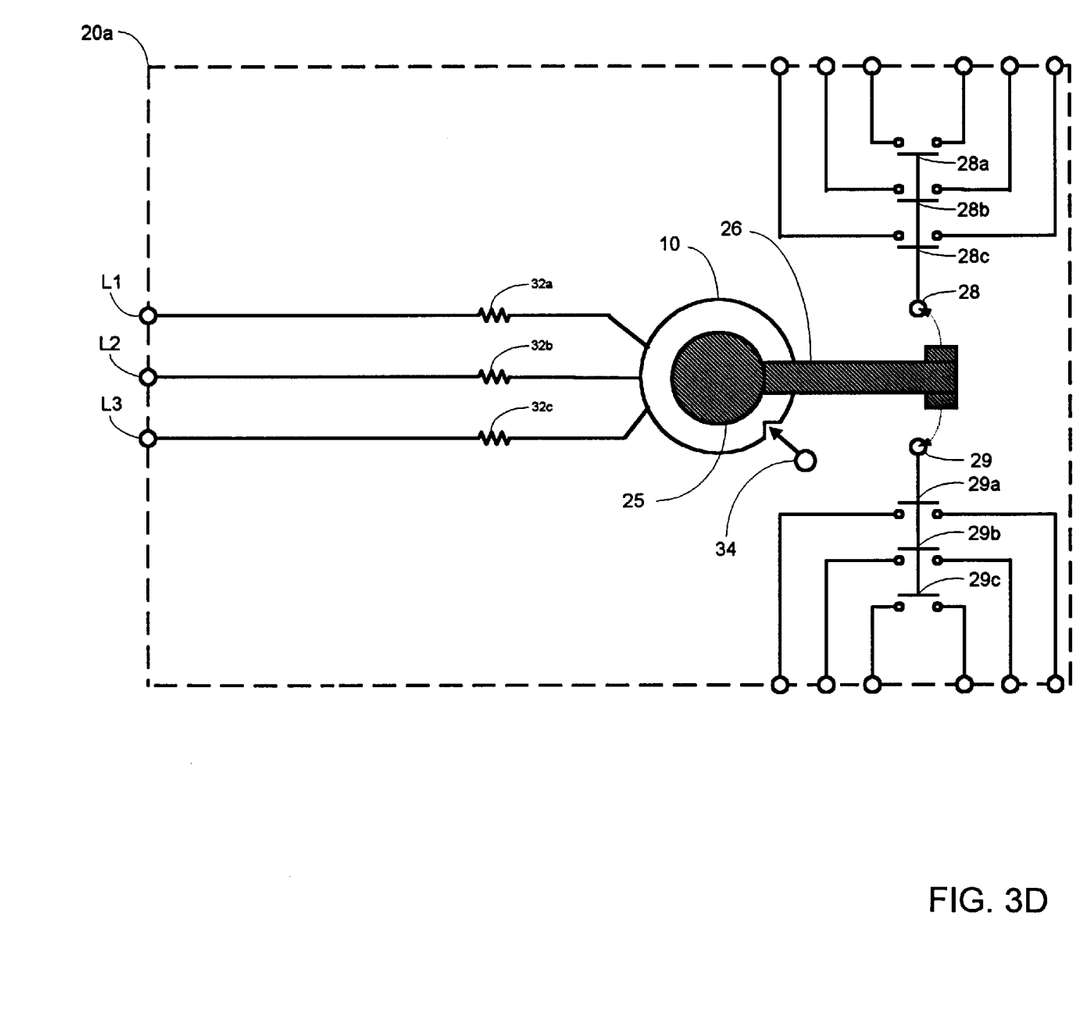
FIG. 3D is a schematic view of an alternative embodiment of the motor rotational direction control module for use in a three-phase motor application.
Figure 4A:
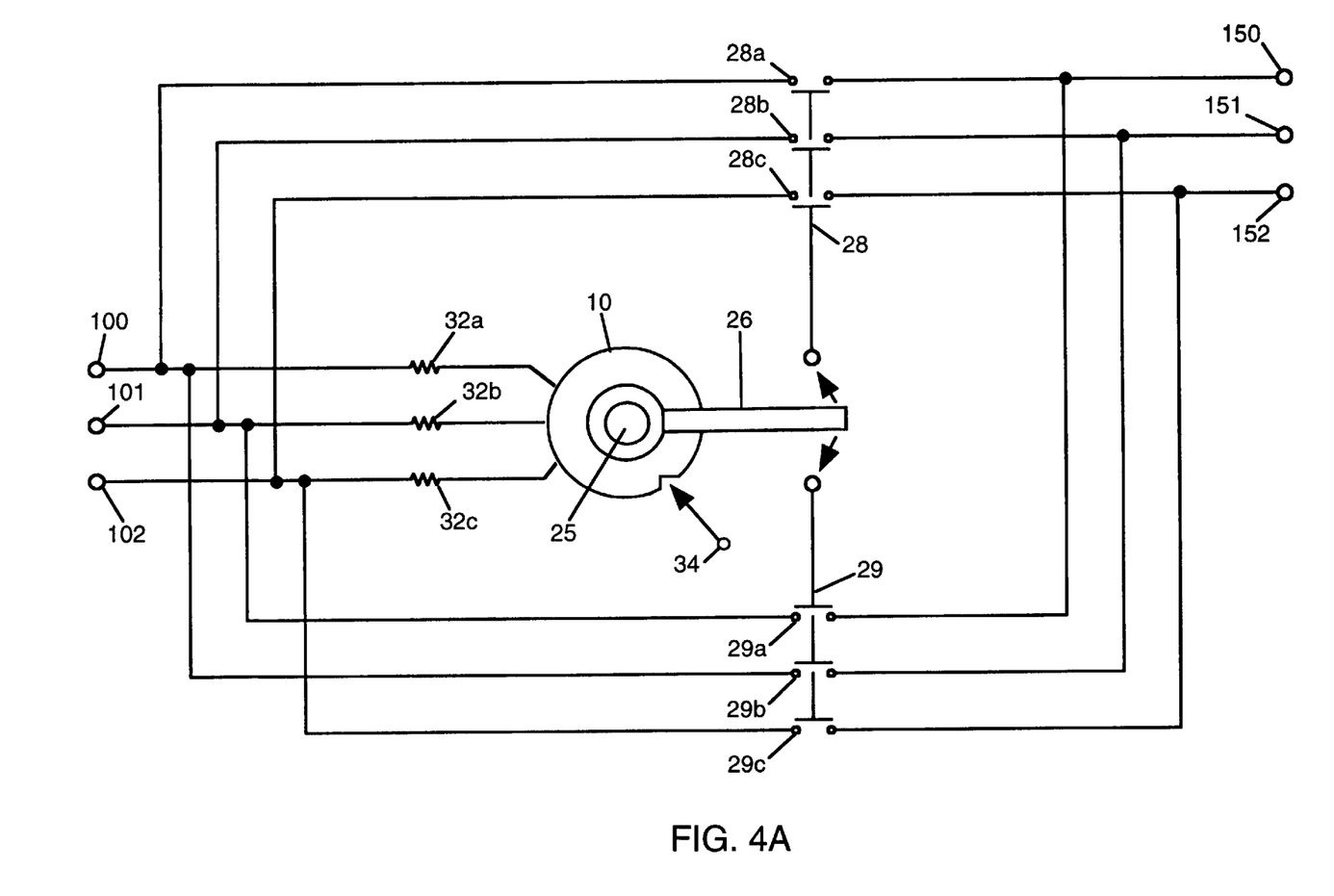
FIG. 4A is a schematic view of an alternative embodiment of the motor rotational direction detector as applied in protecting and correcting the phase sequencing in a three-phase motor application.

An alternative embodiment for the reversal protection of a three-phase motor is shown in FIGS. 3D and 4A. This embodiment is for a portable protection apparatus that can be added to any existing three-phase motor. It is comprised of a direction-sensing motor 10 which is typically a three-phase motor, such as a Bodine ½0th Fractional Horsepower Motor, type NPP-34, 230/460 VAC, that is rated for continuous duty, or any other similar three-phase motor. The motor is current-limit protected with resistors 32a, 32b and 32c when the motor 10 is stalled by the vane coming in contact with either switch 28 or switch 29. Secured to the motor shaft 25 by a setscrew 24 is a direction switch actuator or vane 26. When the direction-sensing motor 10 starts, its direction being determined by the phase sequence when connected to the input power lines, the actuator vane 26 is free to rotate in either a clockwise or counter-clockwise direction. When the vane actuator 26 rotates in the clockwise direction, it activates a ganged switch 29, having contacts 29a, 29b and 29c. Should the actuator vane 26 rotate in the opposite direction, counter-clockwise, ganged switch 28, having contacts 28a, 28b and 28c is closed. A detented leaf spring 34 restores the neutral position of the vane 26 when the power is removed.

Figure 4B:
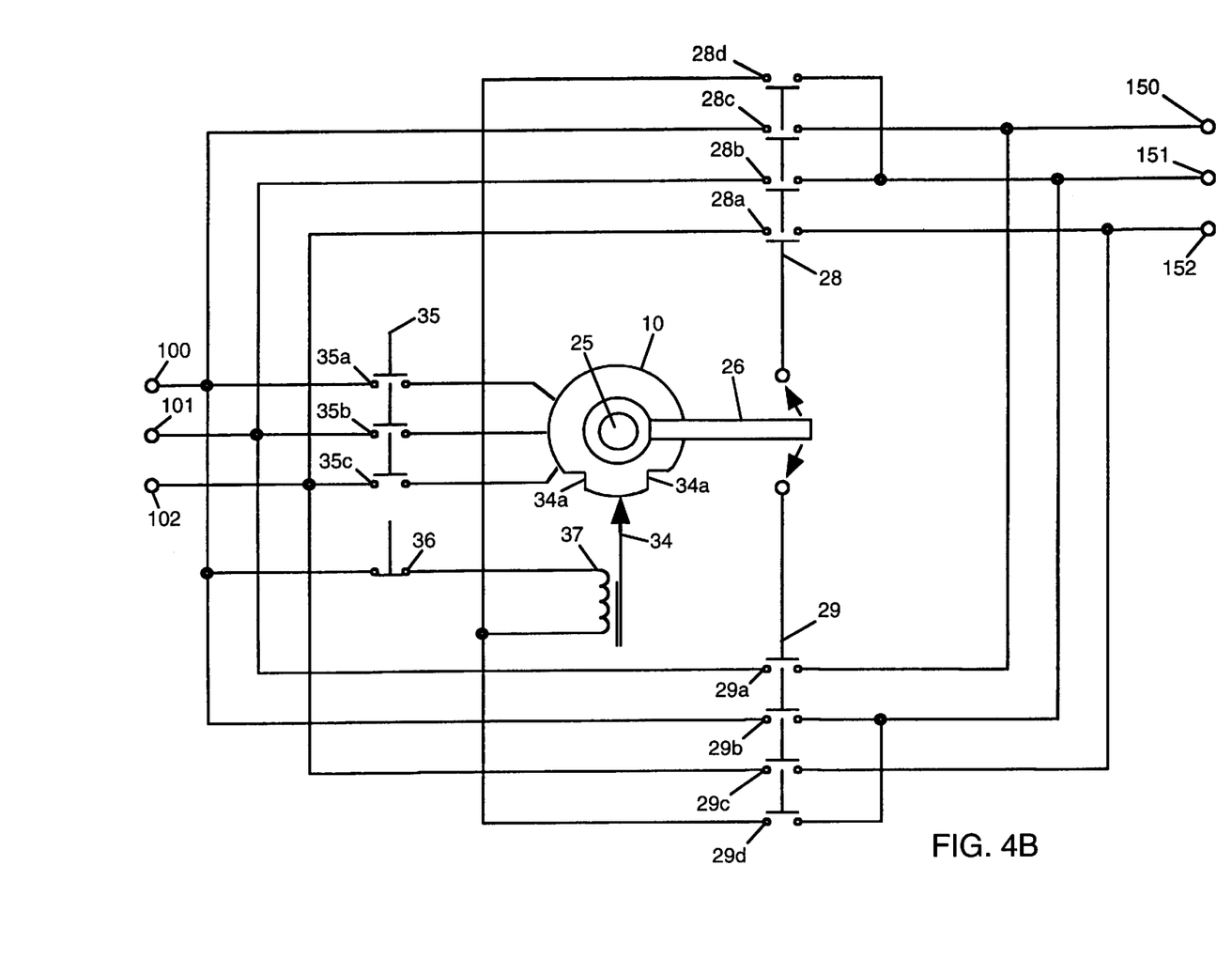
FIG. 4B is a schematic view of another alternative embodiment of a portable motor rotational direction protector as applied in protecting and correcting the phase sequencing in a portable three-phase motor application.

Still yet another alternative embodiment for the reversal protection of a three-phase motor is shown in FIG. 4B. This embodiment is also for a portable protection apparatus that can be added to any existing three-phase motor. It is comprised of a direction-sensing motor 10 which is typically a three-phase motor, such as a Bodine ½0th Fractional Horsepower Motor, type NPP-34, 230/460 VAC, that is rated for continuous duty, or may be any other similar three-phase motor. Secured to the motor shaft 25 by a setscrew 24 is a direction switch actuator or vane 26. When the direction-sensing motor 10 is started by depressing momentary switch 35, its direction being determined by the phase sequence when connected to the input power lines, the actuator vane 26 is free to rotate in either a clockwise or counter-clockwise direction. When the vane actuator 26 rotates in the clockwise direction, it activates a ganged switch 29, having contacts 29a, 29b and 29c, as well as, holding contact 29d. Should the actuator vane 26 rotate in the opposite direction, counter-clockwise, ganged switch 28, having contacts 28a, 28b and 28c, as well as, holding contact 29d, is closed. Detent solenoid 37, whose core 34a is restored by gravity, returns to its neutral position of the vane 26 when the power is removed. Stopping the motor reversal protection system is accomplished by depressing the momentary stop switch 36.

In still another alternative embodiment, two electronic phase sequence detectors are used, one having an output for an ABC sequence and the other having an output for a BAC sequence; each having an output to drive the respective motor starting relays to offer a similar three phase motor reversal protection.

There may be other improvements, modifications and embodiments that will become apparent to one of ordinary skill in the art upon review of this disclosure. As such, these improvements, modifications and embodiments are considered to be within the scope of this invention as defined in the claims and equivalents thereof.

I claim:

1. A reversal protection apparatus for use with an electrical multiphase motor interconnected on a circuit to a power source through multiphased power lines, the electrical multiphase motor having an established normal directional rotation, the apparatus comprising:

a rotatable phase sequence detector with a power input from said power lines, the detector including a means for sensing the phase sequence of the power input, said detector interconnected between the power source and the electrical multiphase motor;

a normal direction contactor and a reverse direction contactor, both said contactors in articulation with the sensing means of the phase sequence detector;

a correcting means communicating with said contactors to start the electrical multiphase motor in the established rotational direction and prevent its rotation in the opposite direction; and, wherein the correcting means starts the electrical multiphase motor without intervention obviating a necessity for resetting the apparatus upon detection of a phase reversal, whereby the electrical multiphase motor starts without intervention and operates in the established direction via a corrected phase sequence of said input.

2. The reversal protection apparatus of claim 1, the means for sensing comprising a phase sequence detecting motor having a shaft having a depending actuator vane deployed between direction sensing contacts, a direction of rotation dependent upon the applied phase sequence of the input, and a start relay that is automatically de-energized upon starting the electrical multiphase motor in the established rotational direction, thereby stopping a rotation of the detector motor;

the correcting means comprising an alternate relay connection path of said circuit, thereby correcting the phase sequence of the input, so that the electrical multiphase motor will run in the same unidirectional pre-determined direction.

3. The reversal protection apparatus of claim 2, wherein the actuator vane extends radially from the shaft.

4. The reversal protection apparatus of claim 3, wherein the actuator vane is rigidly secured to the motor shaft.

5. The reversal protection apparatus of claim 4, wherein the actuator vane is free to rotate in either a clockwise or a counter-clockwise direction.

6. The reversal protection apparatus of claim 5, wherein the actuator vane is weighted and held in a neutral centered position between the rotational direction sensing contacts by gravity.

7. A reversal protection apparatus of claim 6, further comprising first and second ganged switches, each having three contacts for closure by either the clockwise or counter-clockwise rotation of the vane;

wherein a current limiting means is connected in advance of the three-phase protecting motor apparatus for preserving the motor in a stall; and, further comprising a detented spring associated with the vane to restore a neutral position thereof when power is removed, for a portable protection apparatus disposed for addition to any existing three-phase motor.

8. The reversal protection apparatus of claim 7, the actuator vane further comprising a flat plate being held in a neutral centered position by two centering springs and being positioned between said rotational direction sensing contacts, whereby the detector can be mounted in any position without reference to the gravitational forces exerted upon it.

9. The reversal protection apparatus of claim 8, wherein the centering springs comprise helical springs.

10. The reversal protection apparatus of claim 8, said rotational direction sensing contacts comprising microswitches for activation by rotation of the actuator vane, each of the microswitches mounted on a flat plate having rotational stops for preventing the vane from over-traveling and protecting the microswitches from having too much force exerted thereon.

11. The reversal protection apparatus of claim 10, the phase sequence determining three-phase motor having a momentary contact push button, a self-latching motor start relay that is energized by closure of the momentary contact push button, and three relay contacts for application of power to the phase sequence determining three-phase motor.

12. The reversal protection apparatus of claim 11, wherein the motor reversal protection apparatus is energized in advance of starting a three-phase protected motor having three input terminals and connected via a normal mode contactor having an associated coil, three closure contacts, in addition to a normally open SPDT contact that closes concurrent with closure of the normal mode contactor, consequent to the detection of an applied normal phase sequence (ABC), causing a desired direction of rotation of the vane that articulates with the microswitch that energizes the normal direction contactor, a consequent three-phase voltage, having a normal phase sequence (ABC) applied to the protected motor, whereby the protected motor operates in the normal direction, and the normally closed contact interrupts the circuit to said start relay, to de-energize the start relay and to stop the rotation of the sensing detector.

13. The reversal protection apparatus of claim 12, wherein the motor reversal protection apparatus is energized in advance of starting a three-phase protected motor having three input terminals and connected via a reverse mode contactor having an associated coil, three closure contacts, in addition to a normally open SPDT contact that closes concurrent with closure of the normal mode contactor, consequent to the detection of an applied reverse phase sequence (BAC), causing a reverse rotational direction of the vane that articulates with the microswitch that energizes the reverse direction contactor, a consequent three-phase voltage, having a normal phase sequence (ABC) applied to the protected motor, whereby the protected motor operates in the normal direction, and the normally closed contact interrupts the circuit to said start relay, to de-energize the start relay and to stop the rotation of the sensing detector.

14. The reversal protection apparatus of claim 13, wherein the protected three-phase motor has an associated driven load and the protection apparatus prevents the three-phase motor and its driven load from operation in a reverse direction of rotation without a requirement for manually resetting the apparatus upon sensing a phase reversal.

15. The reversal protection apparatus of claim 2, wherein the actuator vane extends radially from the shaft.

16. The reversal protection apparatus of claim 15, wherein the actuator vane is rigidly secured to the motor shaft.

17. The reversal protection apparatus of claim 16, wherein the actuator vane is free to rotate in either a clockwise or a counter-clockwise direction.

18. The reversal protection apparatus of claim 17, wherein the actuator vane is weighted and held in a neutral centered position between the rotational direction sensing contacts by gravity.

19. The reversal protection apparatus of claim 18, the actuator vane further comprising a flat plate being held in a neutral centered position by two centering springs and being positioned between said rotational direction sensing contacts, whereby the detector can be mounted in any position without reference to the gravitational forces exerted upon it.

20. The reversal protection apparatus of claim 19, wherein the centering springs comprise helical springs.

21. The reversal protection apparatus of claim 20, said rotational direction sensing contacts comprising microswitches for activation by rotation of the actuator vane, each of the microswitches mounted on a flat plate having rotational stops for preventing the vane from over-traveling and protecting the microswitches from having too much force exerted thereon.

22. The reversal protection apparatus of claim 21, the DC motor having a DC positive input and a DC negative input, each input connected to a power line, a momentary contact push button, a self-latching motor start relay that is energized by closure of the momentary contact push button, and three relay contacts for application of power to the DC motor.

23. The reversal protection apparatus of claim 22, wherein the motor reversal protection apparatus is energized in advance of starting a DC protected motor having two input terminals and connected via a normal mode contactor having an associated coil, two closure contacts, in addition to a normally open SPDT contact that closes concurrent with closure of the normal mode contactor, consequent to the detection of an applied normal polarity, causing a desired direction of rotation of the vane that articulates with the microswitch that energizes the normal direction contactor, a consequent three-phase voltage, having a normal polarity applied to the protected motor, whereby the protected motor operates in the normal direction, and the normally closed contact interrupts the circuit to said start relay, to de-energize the start relay and to stop the rotation of the sensing detector.

24. The reversal protection apparatus of claim 23, wherein the motor reversal protection apparatus is energized in advance of starting a DC protected motor having two input terminals and connected via a reverse mode contactor having an associated coil, two closure contacts, in addition to a normally open SPDT contact that closes concurrent with closure of the normal mode contactor, consequent to the detection of an applied reverse polarity, causing a reverse rotational direction of the vane that articulates with the microswitch that energizes the reverse direction contactor, a consequent three-phase voltage, having a normal polarity applied to the protected motor, whereby the protected motor operates in the normal direction, and the normally closed contact interrupts the circuit to said start relay, to de-energize the start relay and to stop the rotation of the sensing detector.

25. A reversal protection apparatus for use with a two-phase motor interconnected via a circuit to a two-phase power source through power lines, the electrical motor having a desired normal directional rotation, the apparatus comprising:

a bi-directional phase sequence detector with a power input from said power lines, the detector including a means for sensing the phase sequence of the power input, said detector interconnected between the power source and the two-phase motor;

a normal direction contactor and a reverse direction contactor, both said contactors in articulation with the sensing means of the phase sequence detector; and, a correcting means to start the two-phase motor in the desired normal direction of rotation, for automatically preventing the two phase motor and its driven load from operating in a reverse direction without the necessity of being reset upon detection of a polarity reversal.

26. The reversal protection apparatus of claim 25, the means for sensing comprising the phase sequence detector having a direction of rotation dependent upon the applied phase sequence of the input power lines when the detector is connected to said power lines.

27. The reversal protection apparatus of claim 26, the means for correcting comprising the phase sequence detector including a three phase motor having a motor shaft with an actuator vane that depends upon the motor shaft for deployment, and being positioned between, said rotational direction sensing contacts.

28. The reversal protection apparatus of claim 27, wherein the actuator extends radially from the shaft.

29. The reversal protection apparatus of claim 28, wherein the actuator vane is rigidly secured to the motor shaft.

30. The reversal protection apparatus of claim 29, wherein the actuator vane is free to rotate in either a clockwise or a counter-clockwise direction.

31. The reversal protection apparatus of claim 30, wherein the actuator vane is weighted and held in a neutral centered position between the rotational direction sensing contacts by gravity.

32. The reversal protection apparatus of claim 31, the actuator vane further comprising a flat being held in a neutral centered position by two centering springs and being positioned between said rotational direction sensing contacts, whereby the detector can be mounted in any position without reference to the gravitational forces exerted upon it.

33. The reversal protection apparatus of claim 32, said rotational direction sensing contacts comprising microswitches for activation by rotation of the actuator vane, each of the microswitches mounted on a flat plate having rotational stops for preventing the vane from over-traveling and protecting the microswitches from having too much force exerted thereon.

34. The reversal protection apparatus of claim 33, the phase sequence determining two-phase motor having two reference phase terminal inputs and two quadrature phase terminal inputs, each input connected to a power line, a momentary contact push button, a self-latching motor start relay that is energized by closure of the momentary contact push button, and four relay contacts for application of power to the phase sequence determining two-phase motor.

35. The reversal protection apparatus of claim 34, wherein the motor reversal protection apparatus is energized in advance of starting a two-phase protected motor having four input terminals, having two reference phase terminal inputs and two quadrature phase terminal inputs, and connected via a normal mode contactor having an associated coil, four closure contacts, in addition to a normally open SPDT contact that closes concurrent with closure of the normal mode contactor, consequent to the detection of an applied normal phase sequence (AB), causing a desired direction of rotation of the vane that articulates with the microswitch that energizes the normal direction contactor, a consequent three-phase voltage, having a normal phase sequence (AB) applied to the protected motor, whereby the protected motor operates in the normal direction, and the normally closed contact interrupts the circuit to said start relay, to de-energize the start relay and to stop the rotation of the sensing detector.

36. The reversal protection apparatus of claim 35, wherein the motor reversal protection apparatus is energized in advance of starting a two-phase protected motor having four input terminals, having two reference phase terminal inputs and two quadrature phase terminal inputs, and connected via a reverse mode contactor having an associated coil, three closure contacts, in addition to a normally open SPDT contact that closes concurrent with closure of the normal mode contactor, consequent to the detection of an applied reverse phase sequence (BA), causing a reverse rotational direction of the vane that articulates with the microswitch that energizes the reverse direction contactor, a consequent three-phase voltage, having a normal phase sequence (AB) applied to the protected motor, whereby the protected motor operates in the normal direction, and the normally closed contact interrupts the circuit to said start relay, to de-energize the start relay and to stop the rotation of the sensing detector.

37. A reversal protection apparatus for use with a DC motor interconnected on a circuit to a DC power source through DC power lines, the DC motor having a desired normal directional rotation, the apparatus comprising:

a polarity detector with a power input from said power lines, the detector including a means for sensing the polarity of the power input, said detector interconnected between the power source and the two-phase motor;

a normal direction contactor and a reverse direction contactor, both said contactors in articulation with the sensing means of the phase sequence detector; and, a means for correcting the polarity communicating on the circuit and associated with the polarity detector for an output from the correcting means to start the DC motor in the desired normal direction of rotation and prevent its rotation in the opposite direction.

38. The reversal protection apparatus of claim 37, the means for sensing comprising the polarity detector having a direction of rotation dependent upon the polarity of the input power lines when the detector is connected to said power lines.

39. The reversal protection apparatus of claim 38, the means for correcting comprising the polarity detector including a DC motor having a motor shaft with an actuator vane that depends upon the motor shaft for deployment being positioned between said rotational direction sensing contacts.

* * * * *